(12) United States Patent
Frey et al.

(10) Patent No.: US 11,507,031 B2
(45) Date of Patent: *Nov. 22, 2022

(54) RECOVERED ELECTRIC POWER MEASURING SYSTEM AND METHOD FOR COLLECTING DATA FROM A RECOVERED ELECTRIC POWER MEASURING SYSTEM

(71) Applicant: UOP LLC, Des Plaines, IL (US)

(72) Inventors: Stanley J. Frey, Palatine, IL (US); Gregory A. Schwarzkopf, Arlington Heighls, IL (US); Thomas A. Ebner, West Dundee, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/357,001

(22) Filed: Mar. 18, 2019

(65) Prior Publication Data
US 2019/0286072 A1 Sep. 19, 2019

Related U.S. Application Data

(60) Provisional application No. 62/644,086, filed on Mar. 16, 2018.

(51) Int. Cl.
| | |
|---|---|
| G05B 13/02 | (2006.01) |
| G05F 1/66 | (2006.01) |
| G06F 17/15 | (2006.01) |

(52) U.S. Cl.
CPC ......... *G05B 13/026* (2013.01); *G05B 13/021* (2013.01); *G05F 1/66* (2013.01); *G06F 17/15* (2013.01)

(58) Field of Classification Search
CPC .. G05B 13/026; H02J 3/381; H02J 13/00002; H02J 13/00004; G06F 17/15
See application file for complete search history.

(56) References Cited

U.S. PATENT DOCUMENTS

| | | |
|---|---|---|
| 2,436,683 A | 2/1948 | Wood, Jr. |
| 4,037,655 A | 7/1977 | Carpenter |

(Continued)

FOREIGN PATENT DOCUMENTS

| | | |
|---|---|---|
| CN | 102203780 A | 9/2011 |
| CN | 103917280 A | 7/2014 |

(Continued)

OTHER PUBLICATIONS

Mohammadzadeh, Ashkan, et al., Design of a wind turbine model for clean energy. Case study: Khorasan Razavi regional electricity company, Acta Technica, 62, No. 4B/Jan. 8, 2017.

(Continued)

*Primary Examiner* — Kenneth M Lo
*Assistant Examiner* — Tameem D Siddiquee

(57) ABSTRACT

Apparatus and methods for recovering energy in a petroleum, petrochemical, or chemical plant as described. The invention relates to a recovered electric power measuring system comprising at least one processor; at least one memory storing computer-executable instructions; and at least one receiver configured to receive data from a sensor on an electrical powerline connected to a generator of a power-recovery turbine, the power-recovery turbine located in a petroleum, petrochemical, or chemical process zone wherein a portion of a first process stream flows through the power-recovery turbine and generates recovered electric power as direct current, the power-recovery turbine electrically connected to a single DC to AC inverter and the output of the DC to AC inverter electrically connected to a first substation.

20 Claims, 3 Drawing Sheets

(56) References Cited

U.S. PATENT DOCUMENTS

| | | |
|---|---|---|
| 4,057,736 A | 11/1977 | Jeppson |
| 4,285,481 A | 8/1981 | Biscomb |
| 4,455,614 A | 6/1984 | Martz et al. |
| 5,209,634 A | 5/1993 | Owczarek |
| 5,384,489 A | 1/1995 | Bellac |
| 5,481,145 A | 1/1996 | Canders et al. |
| 6,011,334 A | 1/2000 | Roland |
| 6,216,463 B1 | 4/2001 | Stewart |
| 6,265,453 B1 | 7/2001 | Kennedy |
| 6,354,084 B1 | 12/2002 | McKinley et al. |
| 6,554,074 B2 | 4/2003 | Longbottom |
| 6,607,030 B2 | 8/2003 | Bauer et al. |
| 6,681,155 B1 | 1/2004 | Fujita et al. |
| 6,734,331 B2 * | 5/2004 | Cirrito .................... C06D 5/00 585/652 |
| 6,820,689 B2 | 11/2004 | Sarada |
| 6,898,540 B2 | 5/2005 | Davies |
| 7,002,261 B2 | 2/2006 | Cousins |
| 7,062,359 B2 | 6/2006 | Bjorklund |
| 7,141,901 B2 | 11/2006 | Spring |
| 7,579,703 B2 | 8/2009 | Shifrin |
| 7,632,040 B2 | 12/2009 | Cripps |
| 7,757,493 B2 | 7/2010 | Bell et al. |
| 7,946,789 B2 | 5/2011 | Cripps |
| 7,948,101 B2 | 5/2011 | Burtch |
| 8,404,918 B2 | 3/2013 | Frey |
| 8,510,015 B2 | 8/2013 | Beausoleil et al. |
| 8,680,704 B1 * | 3/2014 | Rooney .................. F03B 13/02 290/54 |
| 8,763,625 B1 | 7/2014 | Carter |
| 8,967,590 B2 | 3/2015 | Minervini et al. |
| 8,985,967 B2 | 3/2015 | Gudivada |
| 9,085,499 B2 | 7/2015 | Frey et al. |
| 9,235,228 B2 | 1/2016 | Gazit et al. |
| 9,677,015 B2 | 6/2017 | Gupta et al. |
| 9,752,460 B2 | 9/2017 | Bowan |
| 9,764,272 B2 | 9/2017 | Martin et al. |
| 10,246,645 B2 | 4/2019 | Froehle et al. |
| 10,260,415 B2 | 4/2019 | Simpkin et al. |
| 2002/0107615 A1 | 8/2002 | Bjorkland |
| 2004/0011523 A1 | 1/2004 | Sarada |
| 2004/0196951 A1 | 10/2004 | Correia et al. |
| 2005/0034463 A1 | 2/2005 | Simpson et al. |
| 2006/0054318 A1 | 3/2006 | Sarada |
| 2006/0056120 A1 | 3/2006 | Kawamura et al. |
| 2007/0209367 A1 | 9/2007 | Bell et al. |
| 2008/0015839 A1 | 1/2008 | Noureldin et al. |
| 2008/0017369 A1 | 1/2008 | Sarada |
| 2008/0238105 A1 | 10/2008 | Ortiz et al. |
| 2008/0290663 A1 | 11/2008 | Shifrin |
| 2009/0125152 A1 | 5/2009 | Skowronski et al. |
| 2009/0158737 A1 * | 6/2009 | Klavers .................. F22B 31/04 60/645 |
| 2010/0019496 A1 | 1/2010 | Yu |
| 2010/0154428 A1 | 6/2010 | Yu |
| 2010/0301617 A1 | 12/2010 | Lundbladh |
| 2011/0077448 A1 | 3/2011 | Frey |
| 2011/0100004 A1 | 5/2011 | Al-Mazeedi |
| 2012/0091817 A1 | 4/2012 | Seymour et al. |
| 2012/0107227 A1 | 5/2012 | Fischer et al. |
| 2012/0118526 A1 | 5/2012 | Sudau et al. |
| 2012/0227440 A1 | 9/2012 | Guidati et al. |
| 2012/0245754 A1 | 9/2012 | Mehnert |
| 2012/0260667 A1 | 10/2012 | Chillar et al. |
| 2012/0314467 A1 | 12/2012 | O'Brien et al. |
| 2012/0326443 A1 | 12/2012 | Vince et al. |
| 2013/0019530 A1 | 1/2013 | Favilli et al. |
| 2013/0199185 A1 | 8/2013 | Wain et al. |
| 2014/0208751 A1 | 7/2014 | Bowan |
| 2014/0331672 A1 | 11/2014 | Filippi et al. |
| 2015/0118131 A1 | 4/2015 | Martin et al. |
| 2016/0079756 A1 * | 3/2016 | Ikeyama ................. H02J 3/381 700/287 |
| 2016/0115839 A1 * | 4/2016 | Abrol ................ B01D 53/8625 60/776 |
| 2016/0141878 A1 | 5/2016 | Johansen |
| 2016/0161536 A1 | 6/2016 | Amminudin |
| 2016/0252015 A1 | 9/2016 | Kusumi et al. |
| 2016/0319198 A1 | 11/2016 | Quanci et al. |
| 2017/0058226 A1 | 3/2017 | Noureldin et al. |
| 2017/0058207 A1 | 3/2017 | Noureldin et al. |
| 2017/0058706 A1 * | 3/2017 | Noureldin ............. F01D 17/145 |
| 2018/0004867 A1 * | 1/2018 | McKinley .............. G06Q 50/06 |
| 2019/0199128 A1 | 6/2019 | Neufeld et al. |

FOREIGN PATENT DOCUMENTS

| | | | |
|---|---|---|---|
| CN | 104463341 A | 3/2015 | |
| CN | 206538206 | 10/2017 | |
| EP | 0552039 | 7/1993 | |
| EP | 2778354 A1 | 9/2014 | |
| FR | 2414162 | 8/1979 | |
| JP | 2003083086 A | 3/2003 | |
| JP | 2004531712 A | 10/2004 | |
| JP | 2006205135 A | 8/2006 | |
| JP | 2009528013 A | 7/2009 | |
| JP | 2011508135 A | 3/2011 | |
| JP | 2012135194 A | 7/2012 | |
| JP | 2013160059 A | 8/2013 | |
| JP | 2013540417 A | 10/2013 | |
| JP | 2016538130 A | 12/2016 | |
| RU | 2014114067 | 10/2015 | |
| WO | 2004088815 A1 | 10/2004 | |
| WO | WO2005010681 | * 2/2005 | ........... G06Q 10/063 |
| WO | 2007105976 A1 | 9/2007 | |
| WO | 2007053036 A1 | 10/2007 | |
| WO | 2012128928 A1 | 9/2012 | |
| WO | 2013148175 A1 | 10/2013 | |
| WO | 2014119569 A1 | 8/2014 | |
| WO | 2014178079 A2 | 11/2014 | |
| WO | 2015065949 A1 | 5/2015 | |
| WO | 2016177376 A1 | 11/2016 | |
| WO | 2018005184 A1 | 1/2018 | |

OTHER PUBLICATIONS

Guitiérrez-Antonio, Claudia, et al, Intensification of the hydrotreating process to produce renewable aviation fuel through reactive distillation, Science Direct, vol. 124, Feb. 2018.

Tsourapas, Vasilios, Control Analysis of Integrated Fuel Cell Systems with Energy Recuperation Devices, 2007.

The Elliot Group, Maximize the Efficiency of your Steam Process, 2014.

U.S. Department of Energy, Replace Pressure-Reducing Valves with Backpressure Turbogenerators.

Mechanical Solutions, Inc., Replacing a Pressure Reducing Valve with a Hydro Turbine for a Municipal Water Supply, Jul. 19, 2016.

Frey, Stanley Joseph, et al., U.S. Appl. No. 15/923,990, filed Mar. 16, 2018 and entitled "Turbine with Supersonic Separation".

Frey, Stanley J., et al., U.S. Appl. No. 62/644,104, filed Mar. 16, 2018 and entitled "System for Power Recovery from Quench and Dilution Vapor Streams".

Frey, Stanley Joseph, et al., U.S. Appl. No. 15/924,037, filed Mar. 16, 2018 and entitled "Power Recovery from Quench and Dilution Vapor Streams".

Frey, Stanley J., U.S. Appl. No. 15/923,936, filed Mar. 16, 2018 and entitled "Energy-Recovery Turbines for Gas Streams".

Frey, Stanley J., et al., U.S. Appl. No. 15/923,945, filed Mar. 16, 2018 and entitled "Consolidation and Use of Power Recovered from a Turbine in a Process Unit".

Frey, Stanley J., et al., U.S. Appl. No. 15/923,964, filed Mar. 16, 2018 and entitled "Process Improvement through the Addition of Power Recovery Turbine Equipment in Existing Processes".

Frey, Stanley Joseph, et al., U.S. Appl. No. 15/923,997, filed Mar. 16, 2018 and entitled "Processes for Adjusting at Least One Process Condition of a Chemical Processing Unit with a Turbine".

Frey, Stanley Joseph, et al., U.S. Appl. No. 15/923,978, filed Mar. 16, 2018 and entitled "Hydroprocessing Unit with Power Recovery Turbines".

(56) References Cited

OTHER PUBLICATIONS

Harris, James W., et al., U.S. Appl. No. 15/923,995, filed Mar. 16, 2018 and entitled "Steam Reboiler with Turbine".
Harris, James W., et al., U.S. Appl. No. 15/924,034, filed Mar. 16, 2018 and entitled "Use of Recovered Power in a Process".

* cited by examiner

RECOVERED ELECTRIC POWER MEASURING SYSTEM AND METHOD FOR COLLECTING DATA FROM A RECOVERED ELECTRIC POWER MEASURING SYSTEM

RELATED APPLICATIONS

This application claims the benefit of U.S. Provisional Patent Application Ser. No. 62/644,086 filed on Mar. 16, 2018, the entirety of which is incorporated herein by reference.

FIELD OF THE INVENTION

Typically, when power-recovery turbines are installed in process streams in petroleum, petrochemical, and chemical process plant, the power is sent through mechanical means to a driver for a pump or compressor because this generally has a higher efficiency than conversion to electricity through a generator. However, these systems have lower reliability than an electrical generator, require that power recovered matches closely with the power consumed in a single driver, and require a lot of connection equipment in couplings, gears, switchgear, clutches, and the like that all must be in a limited space. These issues have been addressed by generating electrical power at the power recovery point and providing that as fungible power for any driver within the process unit. Where power recovery is greater than that consumed within the process unit, it must be exported into the higher voltage level on the plant grid. This has been the case for most major power recovery installations seen to date.

However, sending power to the plant's power grid presents its own set of difficulties. It requires several steps of electricity conditioning, voltage transformation and frequency regulation. Now higher technology equipment is available in the power recovery field that can bring down unit cost to allow economic power recovery at lower power generation sources. When more cost efficient turbines are installed as control elements in process streams, multiple installations may be desirable. However, the power conditioning, transformer, electrical components and safety equipment to protect the high voltage grid is costly for multiple installations.

Therefore, there is a need for improved electricity handling processes and apparatus for using power-recovery turbines. There is further a need to receive data from the electricity handling processes and apparatus for using power-recovery turbines.

DETAILED DESCRIPTION

Figure 1:
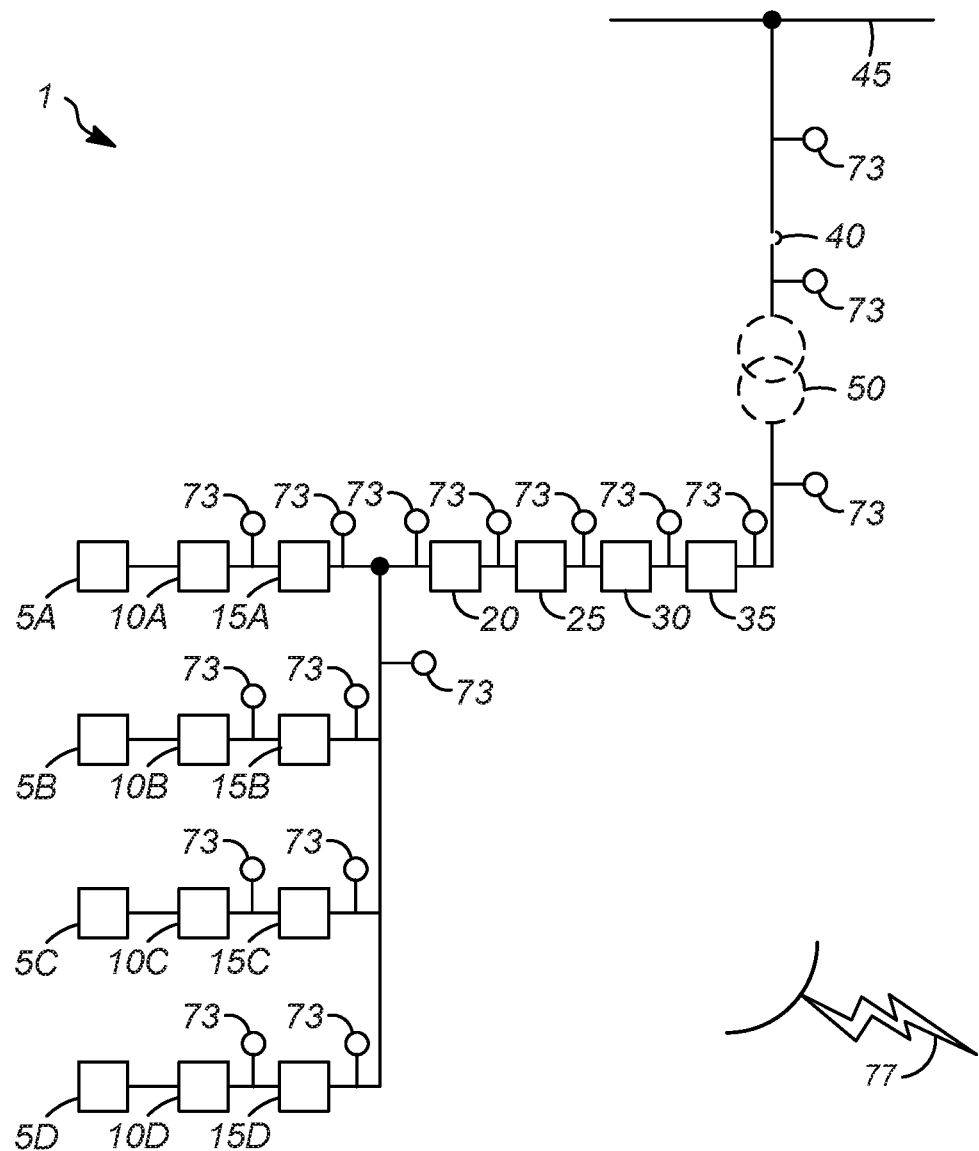
FIG. 1 is an electrical connection diagram of one embodiment of the present invention.

The invention relates to a recovered electric power measuring system comprising at least one processor; at least one memory storing computer-executable instructions; and at least one receiver configured to receive data from a sensor on an electrical powerline connected to a generator of a power-recovery turbine, the power-recovery turbine located in a petroleum, petrochemical, or chemical process zone wherein a portion of a first process stream flows through the power-recovery turbine and generates recovered electric power as direct current, the power-recovery turbine electrically connected to a single DC to AC inverter and the output of the DC to AC inverter electrically connected to a first substation. The system may further comprise an input/output device to collect the data. The processor may be configured to evaluate the data. The processor may be configured to correlate the data. The system may further comprise a transmitter to transmit a signal to the recovered electric power measuring system. The signal may comprise instructions. The signal may be transmitted to the recovered electric power measuring system. The system may further comprise comprising receiving data from multiple systems wherein one system is the recovered electric power measuring system. The processor may be further configured to generate predictive information, regulatory information, or both. The turbine may comprise a sensor. The at least one receiver may be further configured to receive data of time or day or both. The processor may be further configured to generate quantitative information and may be still further configured to correlate the quantitative information with the data of time or day or both.

The invention relates to a method for collecting data from a recovered electric power measuring system, the method comprising receiving data from a sensor on an electrical powerline connected to a generator of a power-recovery turbine, the power-recovery turbine located in a petroleum, petrochemical, or chemical process zone wherein a portion of a first process stream flows through the power-recovery turbine and generates recovered electric power as direct current, the power-recovery turbine electrically connected to a single DC to AC inverter and the output of the DC to AC inverter electrically connected to a first substation. The method may further comprise at least one of displaying, or transmitting, or analyzing the received data. The method may further comprise analyzing the received data to generate at least one instruction and transmitting the at least one instruction. The method may further comprise analyzing the received data and generating predictive information. The predictive information may comprise catalyst performance or catalyst selectivity or catalyst life or any combination thereof.

The invention relates to recovering power in petroleum, petrochemical, or chemical plants by producing electrical power including one or more power-recovery turbine generators. The power-recovery turbines can be used as control elements in the process. The power outputs of the turbine generators are combined and conditioned before being connected to a three-phase low voltage (for example, <600 VAC, such as 480 or 240 VAC) distribution system. Delivering power at the low voltage avoids the equipment capital costs of step-up transformation and medium voltage (for example, 5 kVAC or 15 kVAC class) switchgear and protective relaying. This approach saves equipment capital expense, plot space, field cable runs, maintenance costs, and increases reliability.

Installation of power recovery turbines in petroleum, petrochemical, or chemical processing units is limited due to capital expense, plot area, cost for cable runs, space in the switchgear lineup, and equipment needed to transform the power up from low voltage (e.g., <600 VAC) to the medium voltage (e.g., 5 kVAC or 15 kVAC class). Until recently, there has been a lack of smaller power recovery units (e.g., <500 kW recovered power) that are economical and practical with respect to the space required for the necessary equipment. As a result, only large electrical power recovery generators have been installed, meaning the electrical power generated must be exported from the unit (for example, fluid catalytic cracking (FCC) flue gas power recovery turbines).

In some embodiments, the cost of transforming the electricity up to a higher grid voltage is completely avoided by producing AC power at the low voltage (e.g., <600 VAC) level of the drivers used in the process unit itself. In this way, the amount of power drawn from the grid is reduced as the net power draw of the process unit on the plant grid bus is reduced by the amount of power produced by the power recovery unit. This is particularly interesting for very cost efficient, compact, small scale power recovery units which will generate less power than is consumed within the process unit. In other embodiments, a portion of the electricity is converted to a higher voltage.

The use of a cost effective power recovery device such as disclosed in U.S. Pat. No. 5,481,145 allows the economical recovery of electrical power from otherwise wasted energy (such as control valve letdowns) with good payback. However, in order to maintain a low new unit or revamp cost for the application and to allow for minimal perturbation to the plant electrical system, the electrical transmission from the power recovery device should be limited to the AC bus within the process substation electrical distribution system and conform to the same low voltage (e.g., <600 VAC) and frequency and phase pattern therein. It is desirable for the power recovery device, which could act as a flow controller and thereby have fluctuating current, voltage and frequency output in AC mode, to operate decoupled from the constraints of synchronizing up to the low voltage (e.g., <600 VAC) grid. One way to accomplish this is to rectify the power-recovery turbine power to DC current and then have a dedicated AC inverter to synchronize the output voltage with the process low voltage AC bus.

One aspect of the invention is an apparatus for recovering energy in a petroleum, petrochemical, or chemical plant. In one embodiment, the apparatus comprises a petroleum, petrochemical, or chemical process zone; at least a first fluid process stream flowing through the process zone; at least a first variable-resistance power-recovery turbine, a portion of the first process stream flowing through the first power-recovery turbine to generate electric power as direct current therefrom; a single DC to AC inverter electrically connected to the first power-recovery turbine, the output of the DC to AC inverter electrically connected to a first substation, such as three-phase, low voltage (e.g., <600 VAC) power grid. The fluid process stream can be liquid or gas, or mixtures thereof A process substation is an electrical area dedicated to electrical power distribution to a group of process unit services. There are typically several process and utility substations within a refinery, or petrochemical or chemical plant, and there is one main substation where the main distribution system is located. The process substation is comprised of transformers, an electrical building, switchgear of different voltage levels, motor control centers (MCCs) and single phase distribution panels. Most process substations serve a very large kW electrical load, some of it at low voltage (e.g., <600V) and some of it at medium voltage (for the larger motors, for example, ≥250 HP). As a result, a typical process substation will have both medium and low voltage buses.

When power is recovered, the output of the inverter can be connected to the process substation's low voltage distribution system or, if a sufficiently large amount of power is recovered, it can be stepped-up to the process substation's medium voltage distribution system. Large amounts of recovered power with stepped-up voltage can also be connected to medium voltage systems in other process substations or in the main substation (medium voltage is generally used to reduce voltage drop). However, this incurs additional costs of transformation, switchgear, cabling, etc. and requires significant real estate for the additional equipment.

In some embodiments, the first substation is electrically connected to a piece of equipment in the process zone.

In some embodiments, there is at least a second fluid process stream flowing through the process zone; and at least a second variable-resistance power-recovery turbine. A portion of the second process stream flows through the second power-recovery turbine to generate recovered electric power as direct current therefrom. The second power recovery turbine is electrically connected to the single DC to AC inverter.

In some embodiments, there is a DC bus electrically connected to the first and/or second power-recovery turbines and to the DC to AC inverter.

In some embodiments, the power-recovery turbines comprise adjustable guide vane power-recovery turbines or variable load power-recovery turbines, or combinations thereof.

The apparatus can be used in a wide variety of processes, including, but not limited to, at least one of an alkylation zone, a separation zone, an isomerization zone, a catalytic reforming zone, a fluid catalyst cracking zone, a hydrocracking zone, a hydrotreating zone, a hydrogenation zone, a dehydrogenation zone, an oligomerization zone, a desulfurization zone, an alcohol to olefins zone, an alcohol to gasoline zone, an extraction zone, a distillation zone, a sour water stripping zone, a liquid phase adsorption zone, a hydrogen sulfide reduction zone, an alkylation zone, a transalkylation zone, a coking zone, and a polymerization zone.

In some embodiments, there are three or more power-recovery turbines electrically connected to the DC to AC inverter.

In some embodiments, there may be more than one DC to AC inverter, with each of the DC to AC inverters electrically connected to one or more power-recovery turbines. The grid output of each of the DC to AC inverters is electrically connected to a low voltage (e.g., <600 VAC) power. The power grids can be the same for all of the DC to AC inverters or they can be different.

In some embodiments, the substation comprises at least one alternating current bus, and the output of the DC to AC inverter is electrically connected to the at least one alternating current bus, such as a low voltage (e.g., <600 VAC) bus, in the substation.

In some embodiments, the substation comprises at least one alternating current bus, and the output of the DC to AC inverter is electrically transformed up to medium voltage and then connected to a medium voltage (e.g., 5 kVAC or 15 kVAC Class) bus within the process substation.

In some embodiments, there is a second substation, and the output of the first substation is electrically connected to the second substation. In some embodiments, the second substation has a higher voltage than a voltage of the first substation, and there is a step-up transformer to step-up the voltage of the DC to AC inverter to the higher voltage of the second substation, such as a medium voltage.

In some embodiments, the first substation is electrically connected to at least two petroleum, petrochemical, or chemical process zones. In some embodiments, the output of the first substation is electrically connected to a piece of equipment in the at least two process zones.

Another aspect of the invention is a process for recovering energy from a petroleum, petrochemical, or chemical plant. In one embodiment, the process comprises providing at least a first fluid process streams in a petroleum, petrochemical, or chemical process zone; controlling a flow rate of the first process stream by directing at least a portion of the first process stream through the first power-recovery turbine to generate recovered electric power as direct current therefrom; converting the recovered direct current into recovered alternating current in a single DC to AC inverter; and providing the recovered alternating current to a first substation.

In some embodiments, the first substation is electrically connected to a piece of equipment in the process zone.

In some embodiments, the first substation is electrically connected to at least two petroleum, petrochemical, or chemical process zones. In some embodiments, the process includes providing the recovered alternating current to a piece of equipment in the at least two process zones.

In some embodiments, the process comprises providing at least a second fluid process stream flowing through the process zone; controlling a flow rate of the second process stream by directing at least a portion of the second process stream through at least a second variable-resistance power-recovery turbine to generate recovered electric power as direct current therefrom; combining the direct current from the first and second power recovery turbines; and converting the combined recovered direct current into the recovered alternating current in the DC to AC inverter.

In some embodiments, combining the recovered direct current from the first and second power-recovery turbines comprises combining the recovered direct current from the first and second power-recovery turbines in a DC bus electrically connected to the first and second power-recovery turbines and to the DC to AC inverter.

In some embodiments, the process substation comprises at least one alternating current bus, and wherein the output of the DC to AC inverter is electrically connected to the at least one alternating current bus.

In some embodiments, there is a second substation, and the output of the first substation is electrically connected to the second substation.

In some embodiments, the second substation has a higher voltage than a voltage of the first substation, and the process further comprises stepping up the output of the DC to AC inverter to the higher voltage of the second substation.

In some embodiments, the process also comprises receiving information from the external power grid and a plurality of pressure reducing devices, the plurality of pressure reducing devices comprising: one or more power-recovery turbines; a control valve; or, both; determining a power loss value or a power generated value for each of the pressure reducing devices; determining a total power loss value or a total power generated value based upon the power loss values or the power generated values from each of the pressure reducing devices; and, displaying the total power loss value or the total power generated value on at least one display screen.

In some embodiments, the process also comprises adjusting at least one process parameter in the processing zone based upon the total power loss value or the total power generated value.

In some embodiments, the process also comprises displaying the total power loss value or the total power generated value on at least one display screen.

In some embodiments, the process comprises, after the at least one process parameter has been adjusted, determining an updated power loss value or an updated power generated value for each of the pressure reducing devices; determining an updated total power loss value or an updated total power generated value for the process zone based upon the updated power loss values or the updated power generated values from each of the pressure reducing devices; and, displaying the updated total power loss value or the updated total power generated value on at least one display screen.

In some embodiments, the process also comprises receiving information associated with conditions outside of the process zone, wherein the total power loss value or the total power generated value is determined based in part upon the information associated with conditions outside of the process zone.

In some embodiments, the process also comprises receiving information associated with a throughput of the process zone, wherein the total power loss value or the total power generated value is determined based in part upon the information associated with the throughput of the process zone.

In some embodiments, the process also comprises maintaining the throughput of the process zone while adjusting the at least one process parameter of the portion of a process zone based upon the total power loss value or the total power generated value.

The power will be generated via power-recovery turbines with variable resistance to flow made possible by either guide vanes or variable load on the electrical power generation circuit. The power emanating from the turbines will be DC and can be combined into a single line and sent to an inverter that converts the DC power to AC in sync with and at the same voltage as a power grid. Because the power-recovery turbines produce DC output, it allows their electrical current to be combined without concern for synchronizing frequencies, rotational speeds, etc. for the controlling power-recovery turbines that may have fluctuating and variable rotational speeds individually.

In some embodiments, the process for controlling a flow-rate of and recovering energy from a process stream in a processing unit comprises directing a portion of the process stream through one or more variable-resistance power-recovery turbines to control the flowrate of the process stream using a variable nozzle turbine, inlet variable guide vanes, or direct coupled variable electric load, to name a few, to vary the resistance to flow through the turbine.

The resistance to rotation of the variable-resistance turbine can be varied by an external variable load electric circuit which is in a magnetic field from a magnet(s) that is rotating on the turbine. As more load is put on the circuit, there is more resistance to rotation on the turbine. This in turn imparts more pressure drop across the turbine and slows the process stream flow. An algorithm in the device can also calculate the actual flow through the device by measuring the turbine RPM's and the load on the circuit. The resistance to rotation flow can also be varied by variable position inlet guide vanes. In some embodiments, the power will be generated via power-recovery turbines with variable resistance to flow made possible by either guide vanes or variable load on the electrical power generation circuit. An algorithm to calculate actual flow using the guide vanes position, power output and RPM's can be used.

If slow control response of the turbine is an issue, then the use of the turbine is limited to slow responding or "loose" control point applications. A slow responding application is contemplated to have a response time to reach half way (i.e., 50% of a difference) between a new (or target) steady state condition (e.g., temperature, pressure, flow rate) from an original (or starting) steady state condition when the new (or target) condition differs from the original (or stating) condition of at least 10%, of at least one second, or even greater, for example, ten seconds, at least one minute, at least ten minutes, or an hour or more, for half of the change to completed.

The power grid comprises a power grid internal to the process substation, a power grid external to the process substation, or both. When the power grid is internal to the process substation, the output of the DC to AC inverter can be used in the process substation directly. For example, there may be one or more alternating current buses in the process substation. Alternatively, when the power grid is external to the process substation, it may be at a higher voltage than the process substation. In this case, there is a transformer at the process substation that steps-up the output of the DC to AC inverter to the higher voltage of the power grid external to the process substation.

FIG. 1 illustrates an electrical connection diagram of an embodiment of the process 1 of the present invention. Power-recovery turbines 5A, 5B, 5C, 5D are direct coupled to synchronous generators 10A, 10B, 10C, 10D respectively. The AC currents generated are converted to DC by rectifiers 15A, 15B, 15C, 15D and then combined onto the DC bus. The DC current is sent to inverter 20 wherein it is converted back to AC current. The AC current is conditioned by sine-filter, DC choke and RFI suppression filter 25 before it is sent to AC bus 45. Closure of inverter main contactor 30, main switch 35 and circuit breaker 40 enables this action. If the power recovered exceeds the capacity of the substation low voltage bus, an optional step-up transformer 50 (shown with dashed lines) can be installed to transform the low voltage to medium voltage. As shown, AC bus 45 (either low voltage or medium voltage) can be connected to one or more pieces of equipment in the process zone or zones to which the substation is connected. One or more sensors 73 may be located on an electrical powerline connected to the generator of a power recovery turbine. Any of the sensors 73 may communicate with the recovered electric power measuring system 400 of FIG. 3. In one embodiment, any of the sensors 73 may communicate with receiver 425 of recovered electric power measuring system 400 of FIG. 3 via 77 which may be wired or wireless communication.

Figure 2:
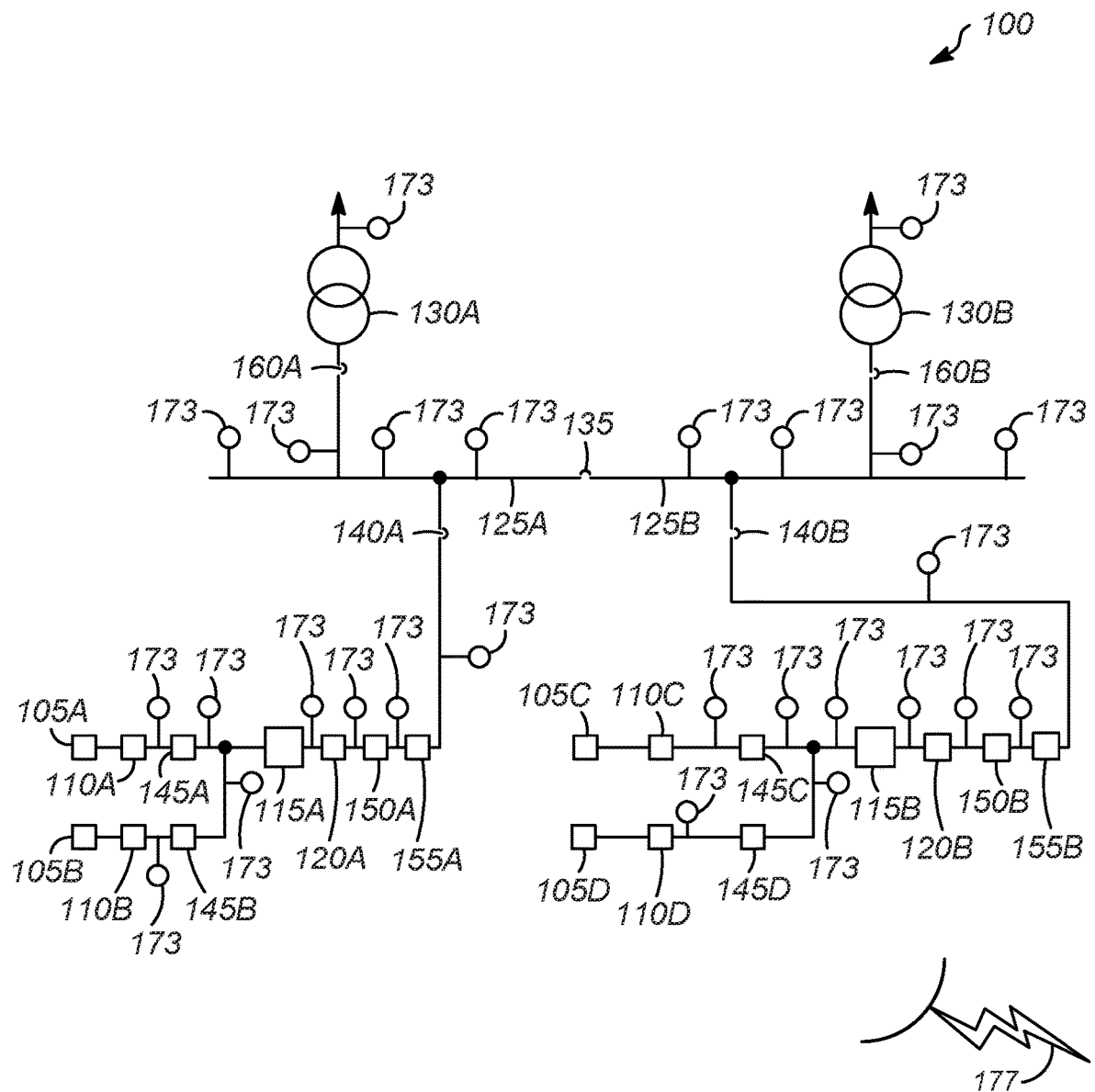
FIG. 2 is an electrical connection diagram of another embodiment of the present invention.

FIG. 2 illustrates an electrical connection diagram of a second embodiment of the process 100 of the present invention. Power-recovery turbines 105A and 105B are direct coupled to synchronous generators 110A and 110B respectively. The AC currents generated are converted to DC by rectifiers 145A and 145B and then combined onto the DC bus. The DC current is sent to inverter 115A wherein it is converted back to AC current. The AC current is conditioned by sine-filter, DC choke and RFI suppression filter 120A before it is sent to AC bus 125A. Closure of inverter main contactor 150A, main switch 155A and circuit breaker 140A enables this action.

Another branch has a similar arrangement of power-recovery turbines 105C and 105D with direct coupled synchronous generators 110C and 110D. The AC currents generated are converted to DC by rectifier 145C and 145D and then combined onto the DC bus. The DC current is sent to inverter 115B wherein it is converted back to AC current. The AC current is conditioned by sine-filter, DC choke and RFI suppression filter 120B before it is sent to AC bus 125B. Closure of inverter main contactor 150B, main switch 155B and circuit breaker 140B enables this action.

As shown, AC bus 125A and 125B are connected to transformers 130A and 130B respectively, and are separated by a normally-open tie circuit breaker 135. This arrangement is a typical secondary-selective distribution system common in large industrial plants.

AC bus 125A and/or 125B can be connected to one or more pieces of equipment in the process zone or zones to which the substation is connected.

One or more sensors 173 may be located on an electrical powerline connected to the generator of a power recovery turbine. Any of the sensors 173 may communicate with the recovered electric power measuring system 400 of FIG. 3. In one embodiment, any of the sensors 173 may communicate with receiver 425 of recovered electric power measuring system 400 of FIG. via 177 which may be wired or wireless communication.

The devices and processes of the present invention are contemplated as being utilized in a petroleum, petrochemical, or chemical process zone. As is known, such petroleum, petrochemical, or chemical process zone units utilize a process control system, typically on a computer in a control center.

The process control system described in connection with the embodiments disclosed herein may be implemented or performed on the computer with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, the processor may be any conventional processor, controller, microcontroller, or state machine. A processor may also be a combination of computing devices, e.g., a combination of a DSP and a microprocessor, two or more microprocessors, or any other combination of the foregoing.

The steps of the processes associated with the process control system may be embodied in an algorithm contained directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is in communication with the processor such the processor reads information from, and writes information to, the storage medium. This includes the storage medium being integral to or with the processor. The processor and the storage medium may reside in an ASIC. The ASIC may reside in a user terminal. Alternatively, the processor and the storage medium may reside as discrete components in a user terminal. These devices are merely intended to be exemplary, non-limiting examples of a computer readable storage medium. The processor and storage medium or memory are also typically in communication with hardware (e.g., ports, interfaces, antennas, amplifiers, signal processors, etc.) that allow for wired or wireless communication between different components, computers processors, or the like, such as between the input channel, a processor of the control logic, the output channels within the control system and the operator station in the control center.

In communication relative to computers and processors refers to the ability to transmit and receive information or data. The transmission of the data or information can be a wireless transmission (for example by Wi-Fi or Bluetooth) or a wired transmission (for example using an Ethernet RJ45 cable or an USB cable). For a wireless transmission, a wireless transceiver (for example a Wi-Fi transceiver) is in communication with each processor or computer. The transmission can be performed automatically, at the request of the computers, in response to a request from a computer, or in other ways. Data can be pushed, pulled, fetched, etc., in any combination, or transmitted and received in any other manner.

According to the present invention, therefore, it is contemplated that the process control system receives information from the power recovery turbines 105A, 105B, 105C, 105D relative to an amount of electricity generated by the power recovery turbines 105A, 105B, 105C, 105D. It is contemplated that the power recovery turbines 105A, 105B, 105C, 105D determine (via the processor) the amount of electricity it has generated. Alternatively, the process control system receiving the information determines the amount of electricity that has been generated by the power recovery turbines 105A, 105B, 105C, 105D. In either configuration, the amount of the electricity generated by the power recovery turbines 105A, 105B, 105C, 105D is displayed on at least one display screen associated with the computer in the control center. If the petroleum, petrochemical, or chemical process zone comprises a plurality of power recovery turbines 105A, 105B, 105C, 105D, it is further contemplated that the process control system receives information associated with the amount of electricity generated by each of the power recovery turbines 105A, 105B, 105C, 105D. The process control system determines a total electrical power generated based upon the information associated with the each of the power recovery turbines 105A, 105B, 105C, 105D and displays the total electrical power generated on the display screen. The total electrical power generated may be displayed instead of, or in conjunction with, the amount of electrical power generated by the individual power recovery turbines 105A, 105B, 105C, 105D.

As discussed above, the electrical energy recovered by the power recovery turbines 105A, 105B, 105C, 105D is often a result of removing energy from the streams that was added to the streams in the processing unit. Thus, it is contemplated that the processes according to the present invention provide for the various processing conditions associated with the petroleum, petrochemical, or chemical process zone to be adjusted into order to lower the energy added to the steam(s).

It is contemplated that the process control system receives information associated with the throughput of the petroleum, petrochemical, or chemical process zone, and determines a target electrical power generated value for the turbine(s) since the electricity represents energy that is typically added to the overall petroleum, petrochemical, or chemical process zone. The determination of the target electrical power generated value may be done when the electricity is at or near a predetermined level. In other words, if the amount of electricity produced meets or exceeds a predetermined level, the process control system can determine one or more processing conditions to adjust and lower the amount of electricity generated until it reaches the target electrical power generated value.

Thus, the process control system will analyze one or more changes to the various processing conditions associated with the petroleum, petrochemical, or chemical process zone to lower the amount of energy recovered by the turbines of the petroleum, petrochemical, or chemical process zone. Preferably, the processing conditions are adjusted without adjusting the throughput of the processing unit. This allows for the petroleum, petrochemical, or chemical process zone to have the same throughput, but with a lower operating cost associated with the same throughput. The process control software may calculate and display the difference between the target electrical power generated value and the total electrical power generated on the display screen.

For example, the process control software may recognize that the total electrical power generated exceeds a predetermined level. Accordingly, the process control software may determine the target electrical power generated value. Based upon other data and information received from other sensors and data collection devices typically associated with the petroleum, petrochemical, or chemical process zone, the process control software may determine that the amount of fuel consumed in a piece of equipment can be lowered. While maintaining the throughput of the petroleum, petrochemical, or chemical process zone, the amount of fuel consumed in the piece of equipment is lowered. While this may lower the electricity generated by the turbine, the lower fuel consumption provides a lower operating cost for the same throughput.

Thus, not only does the present process convert energy that is typically lost into a form that is used elsewhere in the petroleum, petrochemical, or chemical process zone, the petroleum, petrochemical, or chemical process zone is provided with opportunities to lower the energy input associated with the overall petroleum, petrochemical, or chemical process zone and increase profits by utilizing more energy efficient processes.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or received or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or received or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

By way of example, sensors and measurements as to the electricity in any of a variety of electrical power lines ultimately from a generator of a turbine may be employed. Similarly, such a sensor may be associated with any turbine in general. Information as to the day or time or both date and time may be employed as well. Control of the turbine may be employed. The data sensed and received may be used as the basis for adjustment or control of a variety of process variables and conditions, the data may provide regulatory information, predictive information.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more non-transitory computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 3:
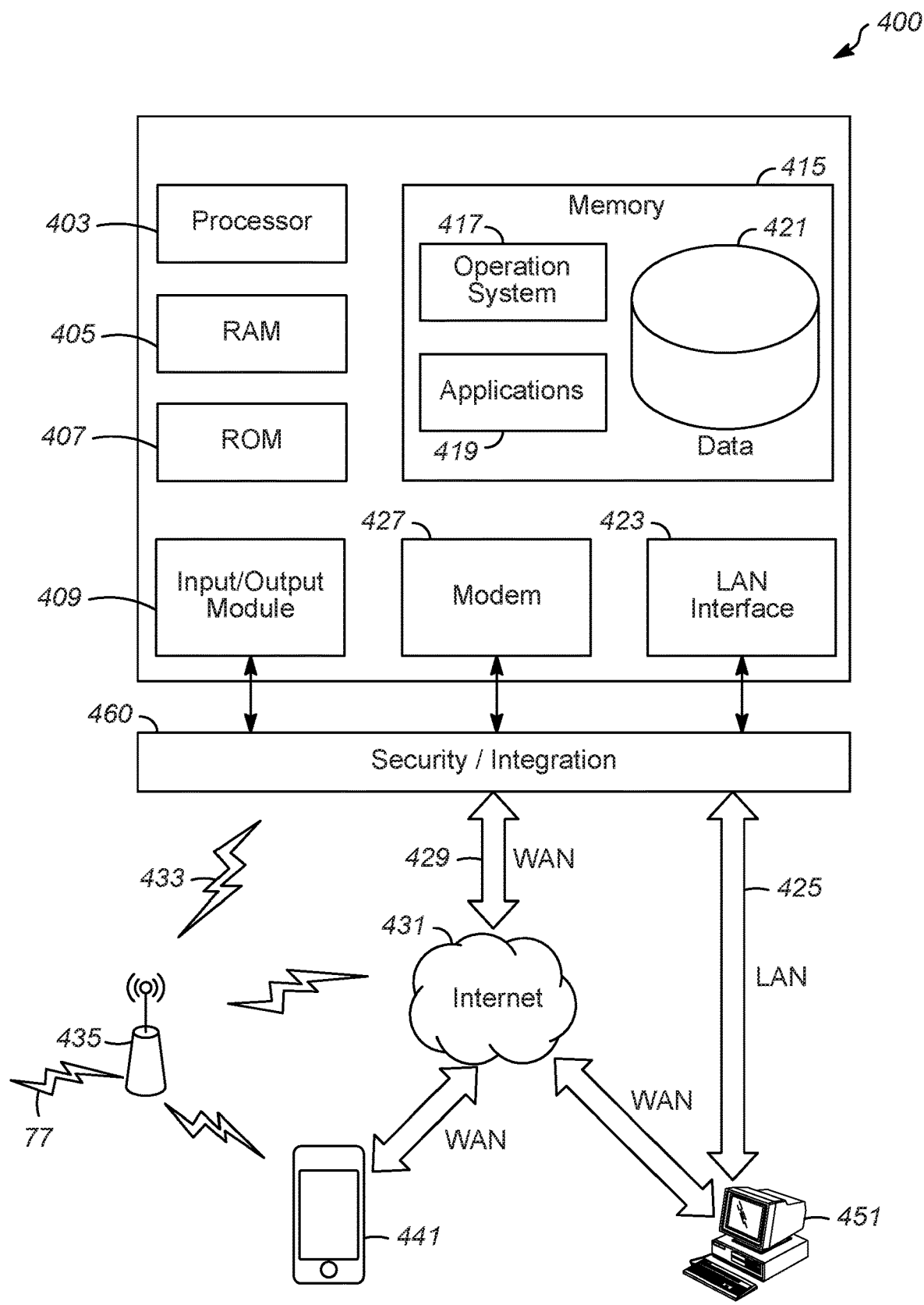
FIG. 3 shows a network environment and computing system that may be used to implement embodiments of the invention.

FIG. 3 illustrates a block diagram of a sensor data analysis system of the recovered electric power measuring system 400 that may be used according to one or more illustrative embodiments of the disclosure. The recovered electric power measuring system 400 may have a processor 403 for controlling overall operation of the recovered electric power measuring system 400 and its associated components, including RAM 405, ROM 407, input/output module 409, and memory 415. The recovered electric power measuring system 400, along with one or more additional devices (e.g., terminals 441, 451) may correspond to any of multiple systems or devices, such as mobile computing devices (e.g., smartphones, smart terminals, tablets, and the like) and/or refinery-based computing devices, configured as described herein for collecting and analyzing sensor data from devices associated with lines, vessels, or devices of one or more units, pertaining to operation or parameter of the one or more units.

Input/Output (I/O) 409 may include a microphone, keypad, touch screen, and/or stylus through which a user of the recovered electric power measuring system 400 may provide input, and may also include one or more of a speaker for providing audio output and a video display device for providing textual, audiovisual and/or graphical output. Software may be stored within memory 415 and/or storage to provide instructions to processor 403 for enabling recovered electric power measuring system 400 to perform various functions. For example, memory 415 may store software used by the recovered electric power measuring system 400, such as an operating system 417, application programs 419, and an associated internal database 421. Processor 403 and its associated components may allow the recovered electric power measuring system 400 to execute a series of computer-readable instructions to transmit or receive data, analyze data, and store analyzed data.

The recovered electric power measuring system 400 may operate in a networked environment supporting connections to one or more remote computers, such as terminals/devices 441 and 451. Recovered electric power measuring system 400, and related terminals/devices 441 and 451, may include devices or sensors associated with equipment, streams, or materials of a process employing streams and a reactor, including devices on-line or outside of equipment, streams, or materials, that are configured to receive and process data. Thus, the recovered electric power measuring system 400 and terminals/devices 441 and 451 may each include personal computers (e.g., laptop, desktop, or tablet computers), servers (e.g., web servers, database servers), sensors, measurement devices, communication systems, or mobile communication devices (e.g., mobile phones, portable computing devices, and the like), and may include some or all of the elements described above with respect to the recovered electric power measuring system 400.

The network connections depicted in FIG. 3 include a local area network (LAN) 425 and a wide area network (WAN) 429, and a wireless telecommunications network 433, but may also include other networks. When used in a LAN networking environment, the recovered electric power measuring system 400 may be connected to the LAN 425 through a network interface or adapter 423. When used in a WAN networking environment, the recovered electric power measuring system 400 may include a modem 427 or other means for establishing communications over the WAN 429, such as network 431 (e.g., the Internet). When used in a wireless telecommunications network 433, the recovered electric power measuring system 400 may include one or more transceivers, digital signal processors, and additional circuitry and software for communicating with wireless computing devices 441 (e.g., mobile phones, short-range communication systems, telematics devices) via one or more network devices 435 (e.g., base transceiver stations) in the wireless network 433.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices recovered electric power measuring system components described herein may be configured to communicate using any of these network protocols or technologies.

Also, illustrated in FIG. 3 is a security and integration layer 460, through which communications may be sent and managed between the recovered electric power measuring system 400 (e.g., a user's personal mobile device, a refinery-based system, external server, etc.) and the remote devices (441 and 451) and remote networks (425, 429, and 433). The security and integration layer 460 may comprise one or more separate computing devices, such as web servers, authentication servers, and/or various networking components (e.g., firewalls, routers, gateways, load balancers, etc.), having some or all of the elements described above with respect to recovered electric power measuring system 400. As an example, a security and integration layer 460 of a mobile computing device, refinery-based device, or a server operated by a provider, an institution, governmental entity, or other organization, may comprise a set of web application servers configured to use secure protocols and to insulate the recovered electric power measuring system 400 from external devices 441 and 451. In some cases, the security and integration layer 460 may correspond to a set of dedicated hardware and/or software operating at the same physical location and under the control of same entities as recovered electric power measuring system 400. For example, layer 460 may correspond to one or more dedicated web servers and network hardware in an organizational datacenter or in a cloud infrastructure supporting a cloud-based recovered electric power measuring system. In other examples, the security and integration layer 460 may correspond to separate hardware and software components which may be operated at a separate physical location and/or by a separate entity.

As discussed below, the data transferred to and from various devices recovered electric power measuring system 400 may include secure and sensitive data, such as measurement data, turbine data, turbine generator data, date and time data, process parameter data, catalyst data, quantitative data, data as to electricity in an electrical power line, and instructions. In at least some examples, transmission of the data may be performed based on one or more user permissions provided. Therefore, it may be desirable to protect transmissions of such data by using secure network protocols and encryption, and also to protect the integrity of the data when stored in a database or other storage in a mobile device, analysis server, or other computing devices in the recovered electric power measuring system 400, by using the security and integration layer 460 to authenticate users and restrict access to unknown or unauthorized users. In various implementations, security and integration layer 460 may provide, for example, a file-based integration scheme or a service-based integration scheme for transmitting data between the various devices in the recovered electric power measuring system 400. Data may be transmitted through the security and integration layer 460, using various network communication protocols. Secure data transmission protocols and/or encryption may be used in file transfers to protect to integrity of the driving data, for example, File Transfer Protocol (FTP), Secure File Transfer Protocol (SFTP), and/or Pretty Good Privacy (PGP) encryption.

In other examples, one or more web services may be implemented within the recovered electric power measuring system 400 and/or the security and integration layer 460. The web services may be accessed by authorized external devices and users to support input, extraction, and manipulation of the data (e.g., sensing data, concentration data, flow control data, etc.) between the recovered electric power measuring system 400. Web services built to support the recovered electric power measuring system 400 may be cross-domain and/or cross-platform, and may be built for enterprise use. Such web services may be developed in accordance with various web service standards, such as the Web Service Interoperability (WS-I) guidelines. In some examples, a flow control data and/or concentration data web service may be implemented in the security and integration layer 460 using the Secure Sockets Layer (SSL) or Transport Layer Security (TLS) protocol to provide secure connections between servers (e.g., the recovered electric power measuring system 400) and various clients 441 and 451 (e.g., mobile devices, data analysis servers, etc.). SSL or TLS may use HTTP or HTTPS to provide authentication and confidentiality.

In other examples, such web services may be implemented using the WS-Security standard, which provides for secure SOAP messages using XML encryption. In still other examples, the security and integration layer 460 may include specialized hardware for providing secure web services. For example, secure network appliances in the security and integration layer 460 may include built-in features such as hardware-accelerated SSL and HTTPS, WS-Security, and firewalls. Such specialized hardware may be installed and configured in the security and integration layer 460 in front of the web servers, so that any external devices may communicate directly with the specialized hardware.

In some aspects, various elements within memory 415 or other components in recovered electric power measuring system 400, may include one or more caches, for example, CPU caches used by the processing unit 403, page caches used by the operating system 417, disk caches of a hard drive, and/or database caches used to cache content from database 421. For embodiments including a CPU cache, the CPU cache may be used by one or more processors in the processing unit 403 to reduce memory latency and access time. In such examples, a processor 403 may retrieve data from or write data to the CPU cache rather than reading/writing to memory 415, which may improve the speed of these operations. In some examples, a database cache may be created in which certain data from a database 421 (e.g., an operating parameter database, a concentration database, correlation database, etc.) is cached in a separate smaller database on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of retrieving data, collecting data, receiving data, recording data, processing data, and analyzing data, such as faster response times and less dependence on network conditions when transmitting/receiving data.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computer devices and system components described herein may be configured to communicate using any of these network protocols or technologies.

Additionally, one or more application programs 419 may be used by the recovered electric power measuring system 400 (e.g., turbine software applications, device configuration software applications, and the like), including computer executable instructions for receiving and storing data from refinery-based systems, and/or mobile computing devices, analyzing the data to determine the amount of sulfur removed in the sulfur stripping vessel, analyzing data to determine the setting or adjustment to the flow of the gas stream, determining and configuring the mobile computing device based on the retrieved and analyzed data, and/or performing other related functions as described herein.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims. In the foregoing, all temperatures are set forth in degrees Celsius and, all parts and percentages are by weight, unless otherwise indicated.

It should be appreciated and understood by those of ordinary skill in the art that various other components, such as valves, pumps, filters, coolers, etc., were not shown in the drawings as it is believed that the specifics of same are well within the knowledge of those of ordinary skill in the art and a description of same is not necessary for practicing or understanding the embodiments of the present invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

While the following is described in conjunction with specific embodiments, it will be understood that this description is intended to illustrate and not limit the scope of the preceding description and the appended claims.

A first embodiment of the invention is an apparatus for recovering energy in a petroleum, petrochemical, or chemical plant comprising a petroleum, petrochemical, or chemical process zone; at least a first fluid process stream flowing through the process zone; at least a first variable-resistance power-recovery turbine, a portion of the first process stream flowing through the first power-recovery turbine to generate recovered electric power as direct current therefrom; a single DC to AC inverter electrically connected to the first power-recovery turbine, the output of the DC to AC inverter electrically connected to a first substation. An embodiment of the invention is one, any or all of prior embodiments in this paragraph up through the first embodiment in this paragraph wherein the first substation is electrically connected to a piece of equipment in the process zone. An embodiment of the invention is one, any or all of prior embodiments in this paragraph up through the first embodiment in this paragraph further comprising at least a second fluid process stream flowing through the process zone; and at least a second variable-resistance power-recovery turbine, a portion of the second process stream flowing through the second power-recovery turbine to generate recovered electric power as direct current therefrom, the second power recovery turbine electrically connected to the single DC to AC inverter. An embodiment of the invention is one, any or all of prior embodiments in this paragraph up through the first embodiment in this paragraph further comprising a DC bus electrically connected to the first power-recovery turbine and to the DC to AC inverter. An embodiment of the invention is one, any or all of prior embodiments in this paragraph up through the first embodiment in this paragraph wherein the power-recovery turbine comprises an adjustable guide vane power-recovery turbine or a variable load power-recovery turbine, or combinations thereof. An embodiment of the invention is one, any or all of prior embodiments in this paragraph up through the first embodiment in this paragraph wherein the process zone comprises at least one of an alkylation zone, a separation zone, an isomerization zone, a catalytic reforming zone, a fluid catalyst cracking zone, a hydrocracking zone, a hydrotreating zone, a hydrogenation zone, a dehydrogenation zone, an oligomerization zone, a desulfurization zone, an alcohol to olefins zone, an alcohol to gasoline zone, an extraction zone, a distillation zone, a sour water stripping zone, a liquid phase adsorption zone, a hydrogen sulfide reduction zone, an alkylation zone, a transalkylation zone, a coking zone, and a polymerization zone. An embodiment of the invention is one, any or all of prior embodiments in this paragraph up through the first embodiment in this paragraph wherein there are three or more power-recovery turbines electrically connected to the DC to AC inverter. An embodiment of the invention is one, any or all of prior embodiments in this paragraph up through the first embodiment in this paragraph wherein the first substation comprises at least one alternating current bus, and wherein the output of the DC to AC inverter is electrically connected to the at least one alternating current bus. An embodiment of the invention is one, any or all of prior embodiments in this paragraph up through the first embodiment in this paragraph further comprising a second substation and wherein the output of the first substation is electrically connected to the second substation. An embodiment of the invention is one, any or all of prior embodiments in this paragraph up through the first embodiment in this paragraph wherein the second substation has a higher voltage than a voltage of the first substation, and further comprising a step-up transformer to step-up an output of the first substation to the higher voltage of the second substation. An embodiment of the invention is one, any or all of prior embodiments in this paragraph up through the first embodiment in this paragraph wherein the first substation is electrically connected to at least two petroleum, petrochemical, or chemical process zones. An embodiment of the invention is one, any or all of prior embodiments in this paragraph up through the first embodiment in this paragraph wherein an output of the first substation is electrically connected to a piece of equipment in the at least two process zones.

A second embodiment of the invention is a process for recovering energy from a petroleum, petrochemical, or chemical plant comprising providing at least a first fluid process stream in a petroleum, petrochemical, or chemical process zone; controlling a flow rate of the first process stream by directing at least a portion of the first process stream through a first variable-resistance power-recovery turbine to generate recovered electric power as direct current therefrom; converting the recovered direct current into recovered alternating current in a single DC to AC inverter; and providing the recovered alternating current to a first substation. An embodiment of the invention is one, any or all of prior embodiments in this paragraph up through the second embodiment in this paragraph wherein the first substation is electrically connected to a piece of equipment in the process zone. An embodiment of the invention is one, any or all of prior embodiments in this paragraph up through the second embodiment in this paragraph wherein the first substation is electrically connected to at least two petroleum, petrochemical, or chemical process zones. An embodiment of the invention is one, any or all of prior embodiments in this paragraph up through the second embodiment in this paragraph further comprising providing the recovered alternating current to a piece of equipment in the at least two process zones. An embodiment of the invention is one, any or all of prior embodiments in this paragraph up through the second embodiment in this paragraph further comprising providing at least a second fluid process stream flowing through the process zone; controlling a flow rate of the second process stream by directing at least a portion of the second process stream through at least a second variable-resistance power-recovery turbine to generate recovered electric power as direct current therefrom; combining the direct current from the first and second power recovery turbines; and converting the combined recovered direct current into the recovered alternating current in the DC to AC inverter. An embodiment of the invention is one, any or all of prior embodiments in this paragraph up through the second embodiment in this paragraph wherein the first substation comprises at least one alternating current bus, and wherein the output of the DC to AC inverter is electrically connected to the at least one alternating current bus. An embodiment of the invention is one, any or all of prior embodiments in this paragraph up through the second embodiment in this paragraph further comprising a second substation, and wherein the output of the first substation is electrically connected to the second substation. An embodiment of the invention is one, any or all of prior embodiments in this paragraph up through the second embodiment in this paragraph wherein the second substation has a higher voltage than a voltage of the first substation, and further comprising stepping up an output of the DC to AC inverter to the higher voltage of the second substation. An embodiment of the invention is one, any or all of prior embodiments in this paragraph up through the second embodiment in this paragraph further comprising receiving information from a plurality of pressure reducing devices, the plurality of pressure reducing devices comprising one or more power-recovery turbines, a control valve, or both; determining a power loss value or a power generated value for each of the pressure reducing devices; determining a total power loss value or a total power generated value based upon the power loss values or the power generated values from each of the pressure reducing devices; and displaying the total power loss value or the total power generated value on at least one display screen. An embodiment of the invention is one, any or all of prior embodiments in this paragraph up through the second embodiment in this paragraph further comprising adjusting at least one process parameter in the process zone based upon the total power loss value or the total power generated value. An embodiment of the invention is one, any or all of prior embodiments in this paragraph up through the second embodiment in this paragraph further comprising displaying the power loss value or the power generated value on the at least one display screen. An embodiment of the invention is one, any or all of prior embodiments in this paragraph up through the second embodiment in this paragraph further comprising after the at least one process parameter has been adjusted, determining an updated power loss value or an updated power generated value for each of the pressure reducing devices; determining an updated total power loss value or an updated total power generated value for the process zone based upon the updated power loss values or the updated power generated values from each of the pressure reducing devices; and displaying the updated total power loss value or the updated total power generated value on the at least one display screen. An embodiment of the invention is one, any or all of prior embodiments in this paragraph up through the second embodiment in this paragraph further comprising receiving information associated with conditions outside of the process zone, wherein the total power loss value or the total power generated value is determined based in part upon the information associated with conditions outside of the process zone. An embodiment of the invention is one, any or all of prior embodiments in this paragraph up through the second embodiment in this paragraph further comprising receiving information associated with a throughput of the process zone, wherein the total power loss value or the total power generated value is determined based in part upon the information associated with the throughput of the process zone. An embodiment of the invention is one, any or all of prior embodiments in this paragraph up through the second embodiment in this paragraph further comprising maintaining the throughput of the process zone while adjusting the at least one process parameter of the portion of a process zone based upon the total power loss value or the total power generated value.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

SPECIFIC EMBODIMENTS

While the following is described in conjunction with specific embodiments, it will be understood that this description is intended to illustrate and not limit the scope of the preceding description and the appended claims.

A first embodiment of the invention is a recovered electric power measuring system comprising (a) at least one processor; (b) at least one memory storing computer-executable instructions; and (c) at least one receiver configured to receive data from a sensor on an electrical powerline connected to a generator of a power-recovery turbine, the power-recovery turbine located in a petroleum, petrochemical, or chemical process zone wherein a portion of a first process stream flows through the power-recovery turbine and generates recovered electric power as direct current, the power-recovery turbine electrically connected to a single DC to AC inverter and the output of the DC to AC inverter electrically connected to a first substation. An embodiment of the invention is one, any or all of prior embodiments in this paragraph up through the first embodiment in this paragraph wherein the at least one receiver is further configured to receive data on date or time or both. An embodiment of the invention is one, any or all of prior embodiments in this paragraph up through the first embodiment in this paragraph further comprising an Input/Output device to collect the data. An embodiment of the invention is one, any or all of prior embodiments in this paragraph up through the first embodiment in this paragraph wherein the processor is configured to evaluate the data. An embodiment of the invention is one, any or all of prior embodiments in this paragraph up through the first embodiment in this paragraph wherein the processor is configured to correlate the data. An embodiment of the invention is one, any or all of prior embodiments in this paragraph up through the first embodiment in this paragraph further comprising a transmitter to transmit a signal to the recovered electric power measuring system. An embodiment of the invention is one, any or all of prior embodiments in this paragraph up through the first embodiment in this paragraph wherein the signal comprises instructions. An embodiment of the invention is one, any or all of prior embodiments in this paragraph up through the first embodiment in this paragraph wherein the signal is transmitted to the turbine. An embodiment of the invention is one, any or all of prior embodiments in this paragraph up through the first embodiment in this paragraph further comprising collecting data from multiple systems wherein one system is the recovered electric power measuring system. An embodiment of the invention is one, any or all of prior embodiments in this paragraph up through the first embodiment in this paragraph wherein the processor is configured to generate predictive information. An embodiment of the invention is one, any or all of prior embodiments in this paragraph up through the first embodiment in this paragraph wherein the processor is configured to generate regulatory reporting information. An embodiment of the invention is one, any or all of prior embodiments in this paragraph up through the first embodiment in this paragraph wherein the turbine comprises a sensor. An embodiment of the invention is one, any or all of prior embodiments in this paragraph up through the first embodiment in this paragraph wherein the processor is configured to generate quantitative information. An embodiment of the invention is one, any or all of prior embodiments in this paragraph up through the first embodiment in this paragraph wherein the processor is further configured to generate quantitative information and further to correlate the quantitative information with the data of time or day or both.

A second embodiment of the invention is a method for collecting data from a recovered electric power measuring system, the method comprising receiving data from a sensor on an electrical powerline connected to a generator of a power-recovery turbine, the power-recovery turbine located in a petroleum, petrochemical, or chemical process zone wherein a portion of a first process stream flows through the power-recovery turbine and generates recovered electric power as direct current, the power-recovery turbine electrically connected to a single DC to AC inverter and the output of the DC to AC inverter electrically connected to a first substation. An embodiment of the invention is one, any or all of prior embodiments in this paragraph up through the second embodiment in this paragraph further comprising at least one of displaying or transmitting or analyzing the received data. An embodiment of the invention is one, any or all of prior embodiments in this paragraph up through the second embodiment in this paragraph further comprising analyzing the received data to generate at least one instruction and transmitting the at least one instruction. An embodiment of the invention is one, any or all of prior embodiments in this paragraph up through the second embodiment in this paragraph further comprising analyzing the received data and generating predictive information. An embodiment of the invention is one, any or all of prior embodiments in this paragraph up through the second embodiment in this paragraph further comprising analyzing the received data and generating quantitative information. An embodiment of the invention is one, any or all of prior embodiments in this paragraph up through the second embodiment in this paragraph further comprising receiving data as to date or time or both date and time, analyzing the received data from the sensor on the electrical powerline to generate quantitative information, and collating the quantitative information and the data as to date or time or both date and time.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A recovered electric power measuring system in a petroleum, petrochemical, or chemical plant comprising a petroleum, petrochemical, or chemical process zone comprising:
    (a) at least one processor;
    (b) at least one memory storing computer-executable instructions; and
    (c) at least one receiver configured to receive data from a sensor on an electrical powerline connected to a generator of a power-recovery turbine, the power-recovery turbine located in the petroleum, petrochemical, or chemical process zone wherein a portion of a first process stream in the petroleum, petrochemical, or chemical process zone flows through the power-recovery turbine and generates recovered electric power as direct current, the power-recovery turbine coupled to a synchronous generator generating AC current, the synchronous generator electrically connected to a rectifier to convert the AC current to DC current, the rectifier electrically connected to a DC bus, the DC bus electrically connected to a DC to AC inverter and an output of the DC to AC inverter electrically connected to a low voltage bus of a first substation, the low voltage bus connected to a petroleum, petrochemical, or chemical process unit in the petroleum, petrochemical, or chemical process zone, wherein the inverter delivers the output at a voltage of less than 600 VAC;
    wherein the first process stream comprises a petroleum stream, a petrochemical stream, or a chemical stream; and
    wherein the portion of the first process stream comprises a portion of the petroleum stream, the petrochemical stream, or the chemical stream from a process selected from at least one of an alkylation process, an isomerization process, a fluid catalyst cracking process, a hydrocracking process, a hydrotreating process, a hydrogenation process, a dehydrogenation process, an oligomerization process, an alcohol to olefins process, an alcohol to gasoline process, a petroleum extraction process, a petrochemical extraction process, a chemical extraction process, a sour water stripping process, a liquid phase adsorption process, a transalkylation process, a coking process, and a polymerization process.

2. The system of claim 1 wherein the at least one receiver is further configured to receive data on date or time or both.

3. The system of claim 1 further comprising an Input/Output device to collect the data.

4. The system of claim 1 wherein the processor is configured to evaluate the data.

5. The system of claim 1 wherein the processor is configured to correlate the data.

6. The system of claim 1 further comprising a transmitter to transmit a signal to the recovered electric power measuring system.

7. The system of claim 6 wherein the signal comprises instructions.

8. The system of claim 6 wherein the signal is transmitted to the turbine.

9. The system of claim 1 further comprising collecting data from multiple systems wherein one system is the recovered electric power measuring system.

10. The system of claim 1 wherein the processor is configured to generate predictive information.

11. The system of claim 1 wherein the processor is configured to generate regulatory reporting information.

12. The system of claim 1 wherein the turbine comprises a sensor.

13. The system of claim 1 wherein the processor is configured to generate quantitative information.

14. The system of claim 2 wherein the processor is further configured to generate quantitative information and further to correlate the quantitative information with the data of time or day or both.

15. A method for collecting data from a recovered electric power measuring system in a petroleum, petrochemical, or chemical plant comprising a petroleum, petrochemical, or chemical process zone, the method comprising receiving data from a sensor on an electrical powerline connected to a generator of a power-recovery turbine, the power-recovery turbine located in petroleum, petrochemical, or chemical process zone wherein a portion of a first process stream in the petroleum, petrochemical, or chemical process zone flows through the power-recovery turbine and generates recovered electric power as direct current, the power-recovery turbine coupled to a synchronous generator generating AC current, the synchronous generator electrically connected to a rectifier to convert the AC current to DC current, the rectifier electrically connected to a DC bus, the DC bus electrically connected to a DC to AC inverter and an output of the DC to AC inverter electrically connected to a low voltage bus of a first substation, the low voltage bus connected to a petroleum, petrochemical, or chemical process unit in the petroleum, petrochemical, or chemical process zone, wherein the inverter delivers the output at a voltage of less than 600 VAC, wherein the first process stream comprises a petroleum stream, a petrochemical stream, or a chemical stream; and wherein the portion of the first process stream comprises a portion of the petroleum stream, the petrochemical stream, or the chemical stream from a process selected from at least one of an alkylation process, an isomerization process, a hydrotreating process, a hydrogenation process, a dehydrogenation process, an oligomerization process, an alcohol to olefins process, an alcohol to gasoline process, a petroleum extraction process, a petrochemical extraction process, a chemical extraction process, a sour water stripping process, a liquid phase adsorption process, a transalkylation process, a coking process, and a polymerization process.

16. The method of claim 15 further comprising at least one of displaying or transmitting or analyzing the received data.

17. The method of claim 15 further comprising analyzing the received data to generate at least one instruction and transmitting the at least one instruction.

18. The method of claim 15 further comprising analyzing the received data and generating predictive information.

19. The method of claim 15 further comprising analyzing the received data and generating quantitative information.

20. The method of claim 15 further comprising receiving data as to date or time or both date and time, analyzing the received data from the sensor on the electrical powerline to generate quantitative information, and collating the quantitative information and the data as to date or time or both date and time.

* * * * *